United States Patent
Jang

(10) Patent No.: US 11,348,488 B2
(45) Date of Patent: May 31, 2022

(54) DISPLAY DEVICE

(71) Applicant: Samsung Display Co., LTD., Yongin-si (KR)

(72) Inventor: Min Sok Jang, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 69 days.

(21) Appl. No.: 17/060,755

(22) Filed: Oct. 1, 2020

(65) Prior Publication Data

US 2021/0319724 A1    Oct. 14, 2021

(30) Foreign Application Priority Data

Apr. 9, 2020 (KR) .................. 10-2020-0043256

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1626* (2013.01)

(58) Field of Classification Search
CPC combination set(s) only.
See application file for complete search history.

(56) References Cited

U.S. PATENT DOCUMENTS

| | | | |
|---|---|---|---|
| 6,859,357 B2* | 2/2005 | Morimoto | G06F 1/1616 248/917 |
| 7,961,288 B2* | 6/2011 | Jang | G02F 1/13394 349/156 |
| 2005/0174335 A1 | 8/2005 | Kent et al. | |
| 2010/0295812 A1 | 11/2010 | Burns et al. | |
| 2015/0192951 A1* | 7/2015 | Chong | G06F 1/1652 359/894 |
| 2021/0263562 A1* | 8/2021 | Min | G06F 1/1686 |
| 2021/0319724 A1* | 10/2021 | Jang | H04M 1/0268 |

FOREIGN PATENT DOCUMENTS

| | | |
|---|---|---|
| EP | 3 503 196 | 6/2019 |
| EP | 3 595 272 | 1/2020 |
| KR | 10-1713167 | 3/2017 |
| KR | 10-2019-0003257 | 1/2019 |
| KR | 10-2019-0064183 | 6/2019 |
| KR | 10-2019-0081335 | 7/2019 |

OTHER PUBLICATIONS

Extended European Search Report for European Patent Application or Patent No. 21165839.8 dated Sep. 9, 2021.

* cited by examiner

*Primary Examiner* — Lisa Lea-Edmonds
(74) *Attorney, Agent, or Firm* — Kile Park Reed & Houtteman PLLC

(57) ABSTRACT

A display device includes a display panel including a folding area, and a metal plate disposed below the display panel. The metal plate includes a first plate and a second plate which are spaced apart from and face each other, at least one spacer disposed between the first plate and the second plate, and a space between the first plate and the second plate, the space excluding the at least one spacer.

20 Claims, 17 Drawing Sheets

DISPLAY DEVICE

CROSS-REFERENCE TO RELATED APPLICATION(S)

This application claims priority to and benefits of Korean Patent Application No. 10-2020-0043256 under 35 U.S.C. § 119, filed in the Korean Intellectual Property Office on Apr. 9, 2020, the entire contents of which are incorporated herein by reference.

BACKGROUND

1. Technical Field

The disclosure relates to a display device capable of improving shock resistance.

2. Description of the Related Art

Electronic devices that provide images to users, such as smartphones, tablet personal computers (PCs), digital cameras, notebook computers, navigation devices, and smart televisions (TVs) include display devices capable of displaying images.

Recently, foldable display devices have increasingly attracted attention. Foldable display devices are highly portable and provide wide screens. Thus, foldable display devices can provide the benefits of both smartphones and tablet PCs.

The folding of a foldable display device may apply stress to each layer that forms the foldable display device. Some of the stack structures of the foldable display device may be damaged by such stress in the process of folding or unfolding the foldable display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure may provide a display device capable of improving shock resistance.

However, embodiments of the disclosure are not restricted to those set forth herein. The above and other embodiments of the disclosure will become more apparent to one of ordinary skill in the art to which the disclosure pertains by referencing the detailed description of the disclosure given below.

According to an embodiment of the disclosure, a display device may include a display panel including a folding area, and a metal plate disposed below the display panel. The metal plate may include a first plate and a second plate which are spaced apart from and face each other, at least one spacer disposed between the first plate and the second plate, and a space between the first plate and the second plate, the space excluding the at least one spacer.

In an embodiment, the at least one spacer may not overlap the folding area, and the space may overlap the folding area.

In an embodiment, a portion of the at least one spacer and a portion of the space may overlap the folding area.

In an embodiment, an area where the at least one spacer overlaps the folding area may be smaller than an area where the at least one spacer does not overlap the folding area.

In an embodiment, a shape in a plan view where the at least at least one spacer overlaps the folding area may differ from a shape in a plan view where the at least one spacer does not overlap the folding area.

In an embodiment, the at least one spacer may occupy about 10% to about 90% of a surface area of the first plate.

In an embodiment, the space may occupy about 10% to about 90% of the surface area of the first plate.

In an embodiment, the display device may further comprise a bonding layer disposed between a surface of the at least one spacer and the first or second plate adjacent to the surface of the at least one spacer.

In an embodiment, the bonding layer may couple the at least one spacer and the first or second plate.

In an embodiment, the bonding layer may be entirely disposed on a surface of the first or second plate.

In an embodiment, the bonding layer may overlap the at least one spacer and does not overlap the space.

In an embodiment, the display device may further comprise an adhesive member disposed between the first plate and the second plate, wherein the adhesive member may be disposed along edges of the first plate and the second plate.

In an embodiment, the adhesive member may surround the at least one spacer and the space in a plan view.

In an embodiment, the metal plate may include a first metal plate and a second metal plate which are separate from each other, and each of the first metal plate and the second metal plate may include the first plate, the second plate, the at least one spacer, and the space.

In an embodiment, the first metal plate and the second metal plate may not overlap the folding area.

In an embodiment, the display panel and the metal plate may include a camera hole, and the camera hole may overlap and penetrate the space.

According to an embodiment of disclosure, a display device may comprise a display panel including a folding area, and a metal plate disposed below the display panel. The metal plate may include a first plate and a second plate which are spaced apart from and face each other, at least one spacer disposed between the first plate and the second plate, and a space in which a part of the at least one spacer is open between the first plate and the second plate.

In an embodiment, the space may be surrounded by the at least one spacer in a plan view.

In an embodiment, the space may be in contact with the first plate and the second plate and pass through the spacers.

In an embodiment, the display device may be an in-foldable display device such that a display surface may face inwards, or an out-foldable display device such that a display surface may face outwards.

According to the aforementioned and other embodiments of the disclosure, spacers may be formed in a metal plate so that a gap can be provided between first and second plates. Thus, the shock resistance of a display device can be improved by allowing the gap between the first and second plates to absorb and distribute shock.

Other features and embodiments may be apparent from the following detailed description, the drawings, and the claims.

BRIEF DESCRIPTION OF THE DRAWINGS

The above and other embodiments and features of the disclosure will become more apparent by describing in detail embodiments thereof with reference to the attached drawings, in which.

DETAILED DESCRIPTION OF THE EMBODIMENTS

Figure 1:
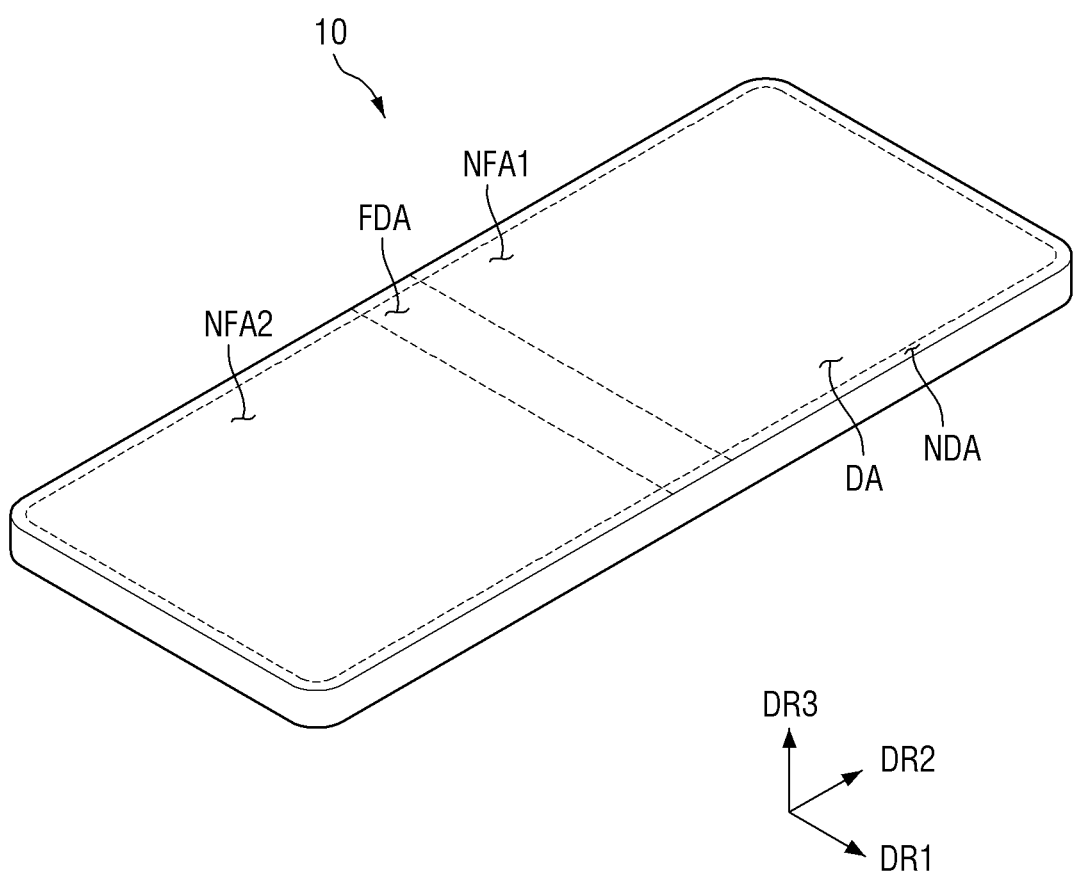
FIG. 1 is a schematic perspective view of a display device according to an embodiment of the disclosure in an unfolded state.

The invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

The term "overlap" may include layer, stack, face or facing, extending over, extending under, covering or partly covering or any other suitable term as would be appreciated and understood by those of ordinary skill in the art. The expression "not overlap" may include "apart from" or "set aside from" or "offset from" and any other suitable equivalents as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

"Space" should be interpreted as inclusive of a gap between components, an air space, a region where air or other fluid may be present, as holes in another component, and as understood by one of ordinary skill in the art.

Use of the singular form may include plural forms as well.

The term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

The phrase "at least one of" is intended to include the meaning of "at least one selected from the group of" for the purpose of its meaning and interpretation. For example, "at least one of A and B" may be understood to mean "A, B, or A and B."

Terms such as "front", "rear", "above", "below", and the like may be used for explaining relational association of components illustrated in the drawings. The terms may be a relative concept and described based on directions expressed in the drawings. The components should not be limited by these terms.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Figure 2:
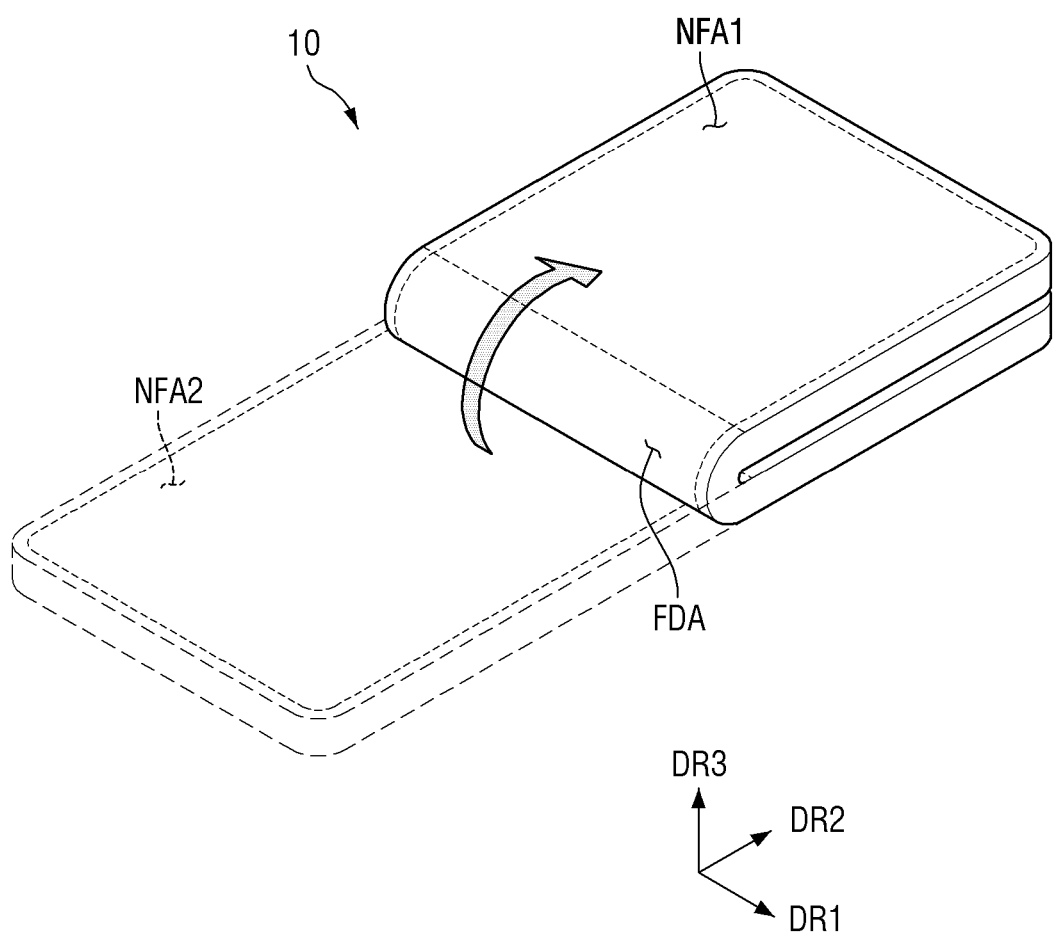
FIG. 2 is a schematic perspective view of the display device of FIG. 1 in a folded state.

FIG. 1 is a schematic perspective view of a display device according to an embodiment of the disclosure in an unfolded state. FIG. 2 is a schematic perspective view of the display device of FIG. 1 in a folded state.

Referring to FIG. 1, a display device 10 may be a foldable display device. The display device 10 will hereinafter be described as being applicable to, for example, a smartphone, but the disclosure is not limited thereto. For example, the display device 10 may also be applicable to various other electronic devices such as a mobile phone, a tablet personal computer (PC), a personal digital assistant (PDA), a portable multimedia player (PMP), a television (TV), a gaming console, a wristwatch-type electronic device, a head-mounted display, a computer monitor, a notebook computer, a car navigation, a car dashboard, a digital camera, a camcorder, an outdoor billboard, an electronic display board, a medical device, a testing device, a home appliance (e.g., a refrigerator or a washing machine), an Internet-of-Things (IoT) device, and the like.

Referring to FIGS. 1 and 2, a first direction DR1 may be a direction parallel to a first side of the display device 10 in a plan view, for example, a horizontal direction of the display device 10, a second direction DR2 may be a direction parallel to a side of the display device 10 that meets the first side of the display device 10 in a plan view, and a third direction DR3 may be the thickness direction of the display device 10.

The display device 10 may be formed in a rectangular shape in a plan view. The display device 10 may be formed in a rectangular shape with right-angled or rounded corners in a plan view. In a plan view, the display device 10 may have two short sides arranged in the first direction DR1 and two long sides arranged in the second direction DR2.

The display device 10 may include a display area DA and a non-display area NDA. In a plan view, the shape of the display area DA may correspond to the shape of the display device 10. For example, if the display device 10 has a rectangular shape in a plan view, the display area DA may also have a rectangular shape in a plan view.

The display area DA may be a region that includes pixels and displays an image. The pixels may be arranged in rows and columns. The pixels may have a rectangular, rhombus, or square shape in a plan view, but the disclosure is not limited thereto. For example, the pixels may have various other shapes such as a tetragonal shape other than a rectangular, rhombus, or square shape, a non-tetragonal polygonal shape, a circular shape, or an elliptical shape in a plan view.

The non-display area NDA may be a region that does not include pixels and thus does not display an image. The non-display area NDA may be disposed adjacent to the display area DA. The non-display area NDA may be disposed to surround the display area DA, as illustrated in FIGS. 1 and 2, but the disclosure is not limited thereto. The display area DA may be partially surrounded by the non-display area NDA.

The display device 10 may be able to maintain a folded or unfolded state. The display device 10 may be in-folded, as illustrated in FIG. 2, so that the display area DA may be disposed on the inside of the display device 10. When in-folded, parts of the top surface of the display device 10 may face each other. In other embodiments, the display device 10 may be out-folded so that the display area DA may be disposed on the outside of the display area 10. When out-folded, parts of the top surface of the display device 10 may face each other.

The display device 10 may be a foldable device. The term "foldable device", as used herein, means a device that may be foldable, and is used to refer not only a device that is already folded, but a device that can be both folded and unfolded. The display device 10 may be folded at an angle of about 180°, but the disclosure is not limited thereto. Even when folded at an angle greater than, or smaller than, about 180° or at an angle of about 90° to about 180°, the display device 10 may also be understood as being folded. Also, even when folded incompletely, the display device 10 may be referred to as being in its folded state if it is folded enough to be out of its unfolded state. For example, even when folded at an angle of about 90° or less, the display device 10 may be referred to as being in its folded state to be distinguished from its unfolded state where the maximum folding angle is about 90° or greater. When folded, the display device 10 may have a curvature radius of about 5 mm or less, about 1 mm to about 2 mm or about 1.5 mm, but the disclosure is not limited thereto.

The display device 10 may include a folding area FDA, a first non-folding area NFA1, and a second non-folding area NFA2. The folding area FDA may be a region where the display device 10 may be folded, and the first and second non-folding areas NFA1 and NFA2 may be regions where the display device 10 may not be folded.

The first non-folding area NFA1 may be disposed on one side of the folding area FDA, for example, on the upper side of the folding area FDA. The second non-folding area NFA2 may be disposed on the other side of the folding area FDA, for example, on the lower side of the folding area FDA. The folding area FDA may be a region that may be bent to have a curvature.

In one embodiment, the folding area FDA may be disposed at a fixed location. The display device 10 may include one folding area FDA at a particular location or may include two or more folding areas FDA. In another embodiment, the folding area FDA may not necessarily be fixed to a particular location but may be set freely at various locations.

In one embodiment, the display device 10 may be bent in the second direction DR2. As a result, since the length, in the second direction DR2, of the display device 10 can be reduced by half, the display device 10 can be carried around with ease.

The direction in which the display device 10 may be folded is not particularly limited. For example, the display device 10 may be folded in, for example, the first direction DR1, in which case, the length, in the first direction DR1, of the display device 10 can be reduced by half.

FIGS. 1 and 2 illustrate that the display area DA and the non-display area NDA overlap the folding area FDA, the first non-folding area NFA1, and the second non-folding area NFA2, but the disclosure is not limited thereto. In other embodiments, the display area DA and the non-display area NDA may overlap at least one of the folding area FDA, the first non-folding area NFA1, and the second non-folding area NFA2.

Figure 3:
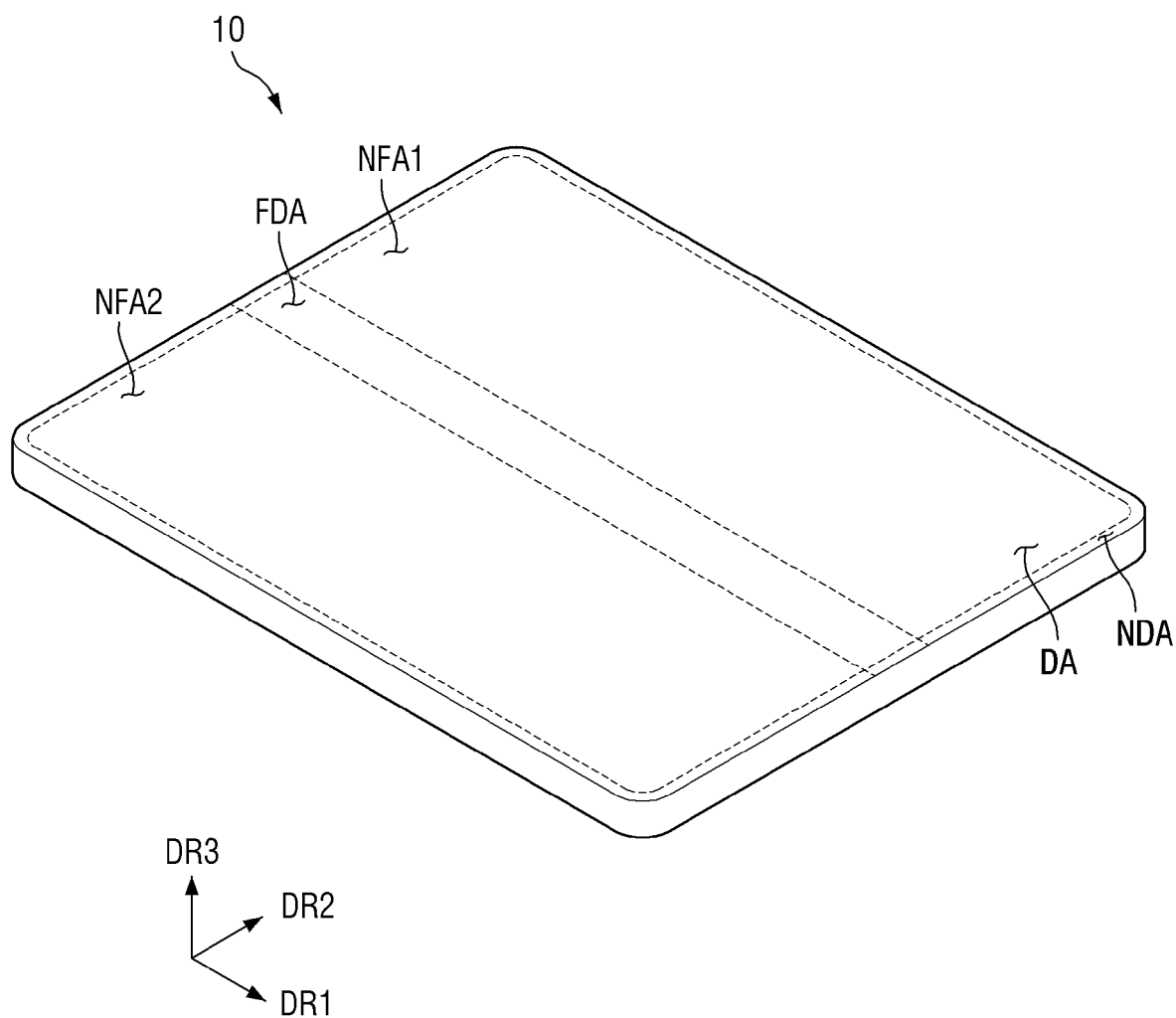
FIG. 3 is a schematic perspective view of a display device according to another embodiment of the disclosure in an unfolded state.
Figure 4:
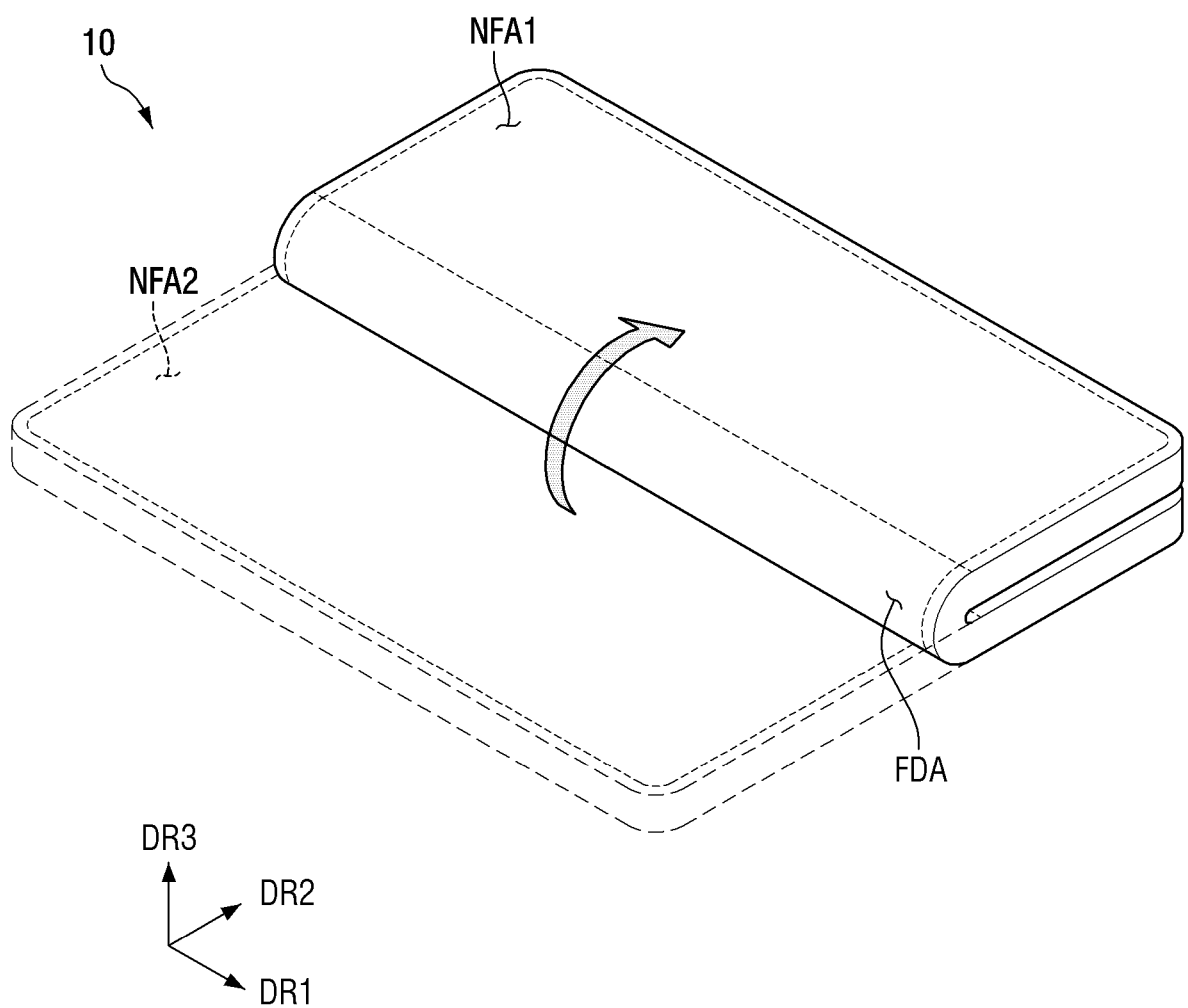
FIG. 4 is a schematic perspective view of the display device of FIG. 3 in a folded state.

FIG. 3 is a schematic perspective view of a display device according to another embodiment of the disclosure in an unfolded state. FIG. 4 is a perspective view of the display device of FIG. 3 in a folded state.

Referring to FIGS. 3 and 4, a first direction DR1 may be a direction parallel to a first side of a display device 10 in a plan view, for example, a vertical direction of the display device 10, a second direction DR2 may be a direction parallel to a side of the display device 10 that meets the first side of the display device 10 in a plan view, and a third direction DR3 may be the thickness direction of the display device 10. In a plan view, the display device 10 may have two long sides arranged in the first direction DR1 and two short sides arranged in the second direction DR2.

The display device 10 may be in-folded so that a display area DA may be disposed on the inside of the display device 10, as illustrated in FIG. 4, or may be out-folded so that the display area DA may be disposed on the outside of the display device 10. The display device 10 may include a folding area FDA, a first non-folding area NFA1, and a second non-folding area NFA2. The folding area FDA may be a region that may be bent to have a curvature. The display device 10 may be folded in the second direction DR2. As a result, since the length, in the second direction DR2, of the display device 10 can be reduced by half, the display device 10 can be carried around with ease.

Figure 5:
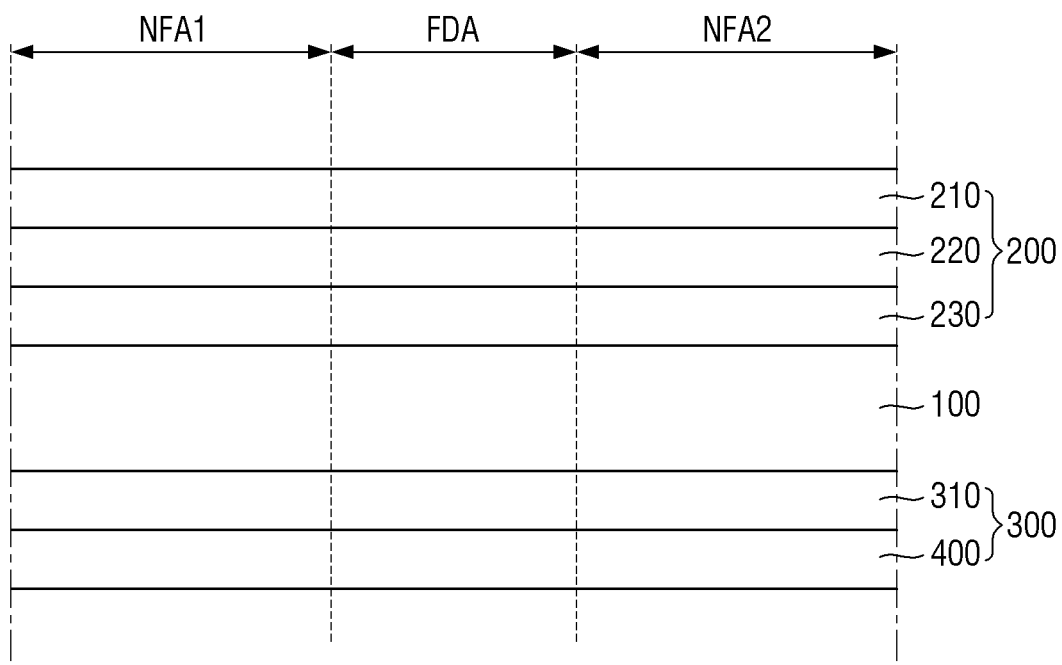
FIG. 5 is a schematic cross-sectional view of a display device according to another embodiment of the disclosure in an unfolded state.
Figure 6:
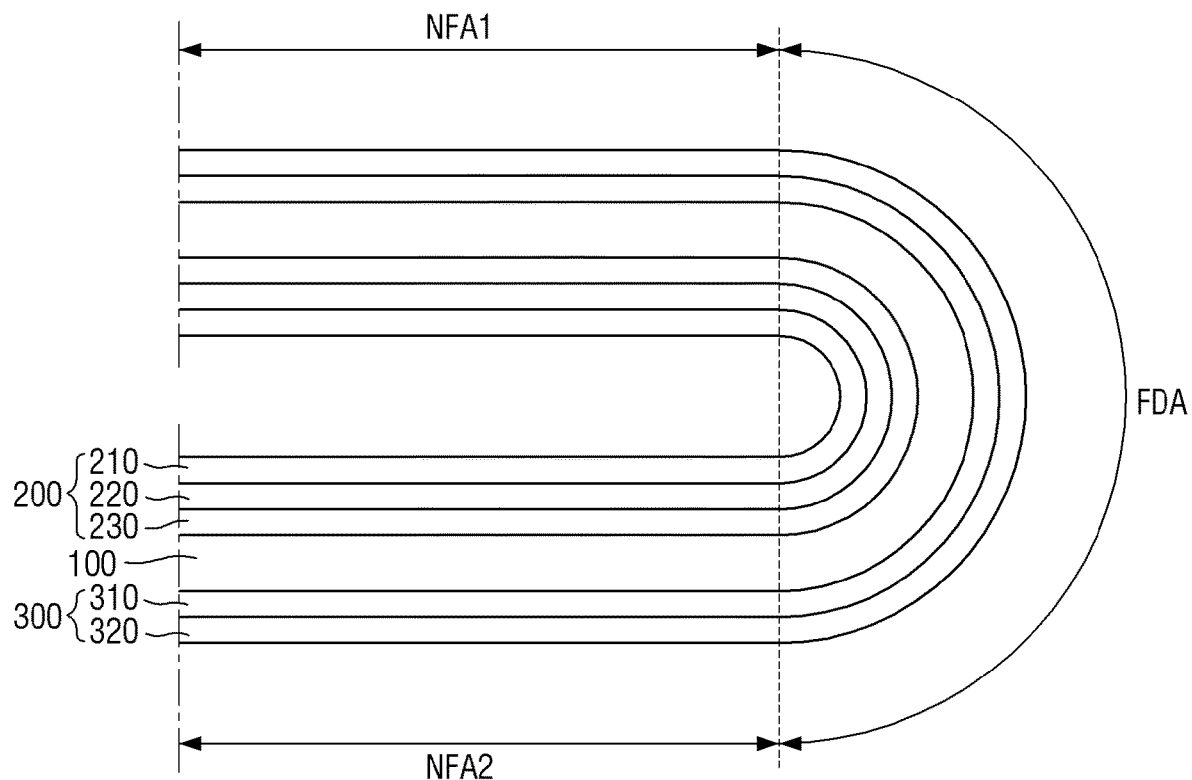
FIG. 6 is a schematic cross-sectional view of the display device of FIG. 5 in a folded state.

FIG. 5 is a schematic cross-sectional view of a display device according to another embodiment of the disclosure in an unfolded state. FIG. 6 is a schematic cross-sectional view of the display device of FIG. 5 in a folded state.

Referring to FIGS. 5 and 6, a display device 10 may include a display panel 100, a front stack structure 200, which may be stacked at the front of the display panel 100, and a rear stack structure 300, which may be stacked at the rear of the display panel 100. Here, the front of the display panel 100 may refer to the display direction of the display panel 100, and the rear of the display panel 100 may refer to the direction opposite to the front of the display panel 100. A first surface of the display panel 100 may be at the front of the display panel 100, and a second surface of the display panel 100 may be at the rear of the display panel 100.

The display panel 100, which may be a panel that displays a screen or an image, may be, for example, a self-emitting display panel such as an organic light-emitting diode (OLED) display panel, an inorganic electroluminescent (EL) display panel, a quantum-dot light-emitting diode (QLED) display panel, a micro-light-emitting diode (micro-LED) display panel, a nano-light-emitting diode (nano-LED) display panel, a plasma display panel (PDP), a field emission display (FED) panel, or a cathode-ray tube (CRT) display panel or a light-receiving display panel such as a liquid crystal display (LCD) panel or an electrophoretic display panel (EPD). The display panel 100 will hereinafter be described as being, for example, an OLED display panel, which will simply be referred to as the display panel 100 unless specified otherwise. However, the display panel 100 is not particularly limited to an OLED display panel, and various other display panels may be used as the display panel 100.

The display panel 100 may further include a touch member. The touch member may be provided as a separate panel or film from the display panel 100 and may be attached on the display panel 100. In other embodiments, the touch member may be provided as a touch layer in the display panel 100. The touch member will hereinafter be described as being provided and included in the display panel 100, but the disclosure is not limited thereto.

The front stack structure 200 may be disposed at the front of the display panel 100. The front stack structure 200 may include a polarizing member 230, a shock-absorbing layer 220, and a cover window 210, which are sequentially stacked at the front of the display panel 100.

The polarizing member 230 may polarize light that passes therethrough. The polarizing member 230 may reduce the reflection of external light. In one embodiment, the polarizing member 230 may be a polarizing film. The polarizing film may include a polarizing layer and protective members that sandwich the polarizing layer from above and below the polarizing layer. The polarizing layer may be a polyvinyl alcohol film. The polarizing layer may be stretched in one direction. The direction in which the polarizing layer may be stretched may be the absorption axis of the polarizing layer, and the direction perpendicular to the absorption axis of the polarizing layer may be the transmission axis of the polarizing layer. The protective members may be disposed on both surfaces of the polarizing layer. The protective members may be formed of a cellulose resin such as triacetyl cellulose or a polyester resin, but the disclosure is not limited thereto.

The shock-absorbing layer 220 may be disposed at the front of the polarizing member 230. The shock-absorbing layer 220 may protect the display panel 100 from external shock. In one embodiment, the shock-absorbing layer 220 may be a polymer film. The polymer film may include at least one of polyethylene terephthalate (PET), polyethylene naphthalate (PEN), polyether sulfone (PES), polyimide (PI), polyarylate (PAR), polycarbonate (PC), polymethyl methacrylate (PMMA), and a cycloolefin copolymer (COC) resin.

The cover window 210 may be disposed at the front of the shock-absorbing layer 220. The cover window 210 may protect the display panel 100. The cover window 210 may be formed of a transparent material. The cover window 210 may include, for example, glass, plastic, or a combination thereof.

The cover window 210 may include glass such as ultra-thin glass (UTG) or thin glass. The cover window 210 may be flexible, e.g., bendable, foldable, or rollable. Specifically, glass having a thickness of, for example, about 10 μm to about 300 μm, particularly, about 10 μm to about 300 μm or about 30 μm, may be used. The cover window 210 may include soda lime glass, alkali alumino silicate glass, borosilicate glass, lithium alumina silicate glass, or a combination thereof. The cover window 210 may include chemically- or thermally strengthened glass. The chemically strengthened glass may be obtained by ion exchange treatment using an alkali salt, and the ion exchange treatment may be performed two or more times. The cover window 210 may be a polymer film having both surfaces coated with thin glass.

In a case where the cover window 210 includes plastic, the cover window 210 may be further suitable for providing flexibility such as foldability. The cover window 210 may include, but is not limited to, at least one of the following plastic materials: polyimide, polyacrylate, polymethyl methacrylate (PMMA), polycarbonate (PC), polyethylene naphthalate (PEN), polyvinylidene chloride, polyvinylidene difluoride (PVDF), polystyrene, ethylene vinyl alcohol copolymer, polyethersulphone (PES), polyetherimide (PEI), polyphenylene sulfide (PPS), polyallylate, tri-acetyl cellulose (TAC), or cellulose acetate propionate (CAP).

In some embodiments, the front stack structure 200 may further include front bonding members, which couple pairs of adjacent members stacked in the front stack structure 200. For example, the front bonding members may be disposed between the cover window 210 and the shock-absorbing layer 220 and between the shock-absorbing layer 220 and the polarizing member 230 to couple the cover window 210 and the shock-absorbing layer 220 together and the shock-absorbing layer 220 and the polarizing member 230 together. The front bonding members may be pressure sensitive adhesives (PSAs).

The rear stack structure 300 may be disposed at the rear of the display panel 100. The rear stack structure 300 may include a cushion layer 310 and a metal plate 400, which are sequentially stacked at the rear of the display panel 100.

The cushion layer 310 may absorb external shock to prevent damage to the display panel 100. The cushion layer 310 may be formed as a single layer or a stack of multiple layers. The cushion layer 310 may be formed of an elastic material such as, for example, polyurethane or a polyethylene resin. In one embodiment, the cushion layer 310 may be formed of a sponge-like foam material.

The metal plate 400 may be disposed at the rear of the cushion layer 310. The metal plate 400 may be a support member for coupling the display device 10 to a case. The metal plate 400 may include a rigid material. In one embodiment, the metal plate 400 may be formed of a single metal or a metal alloy such as stainless steel (SUS).

In some embodiments, the rear stack structure 300 may further include a heat dissipation member. The heat dissipation member may be disposed at the rear of the metal plate 400. The heat dissipation member may prevent the propagation of heat generated from the display panel 100 or other parts of the display device 10. In some embodiments, the heat dissipation member may include a first heat dissipation layer, which may include graphite or carbon nanotubes, and a second heat dissipation layer, which may be capable of blocking electromagnetic waves and may be formed as a thin metal layer including a metal with excellent thermal conductivity such as copper, nickel, ferrite, or silver.

The metal plate 400 may have rigidity and may thus protect the display panel 100 from external shock. To improve the shock resistance of the metal plate 400, the stress and strain of the metal plate 400 need to be considered.

A metal plate according to an embodiment of the disclosure, which can improve shock resistance, will hereinafter be described.

Figure 7:
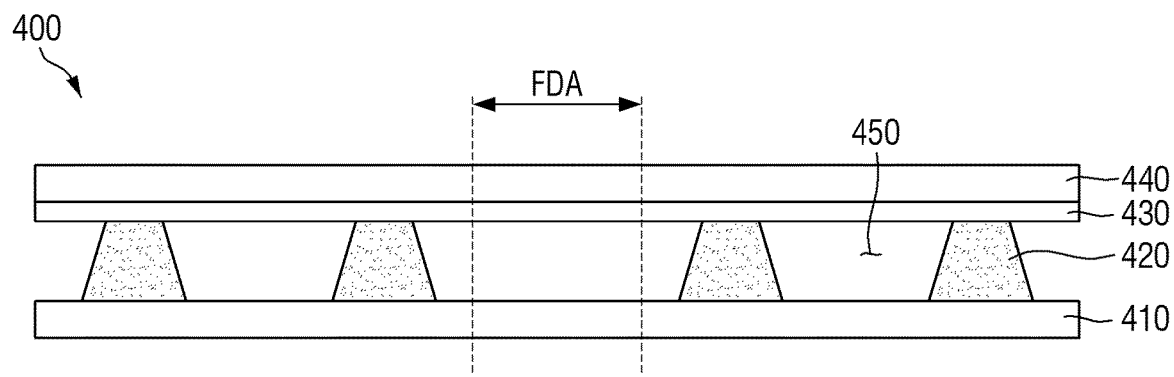
FIG. 7 is a schematic cross-sectional view of a metal plate according to an embodiment of the disclosure.
Figure 8:
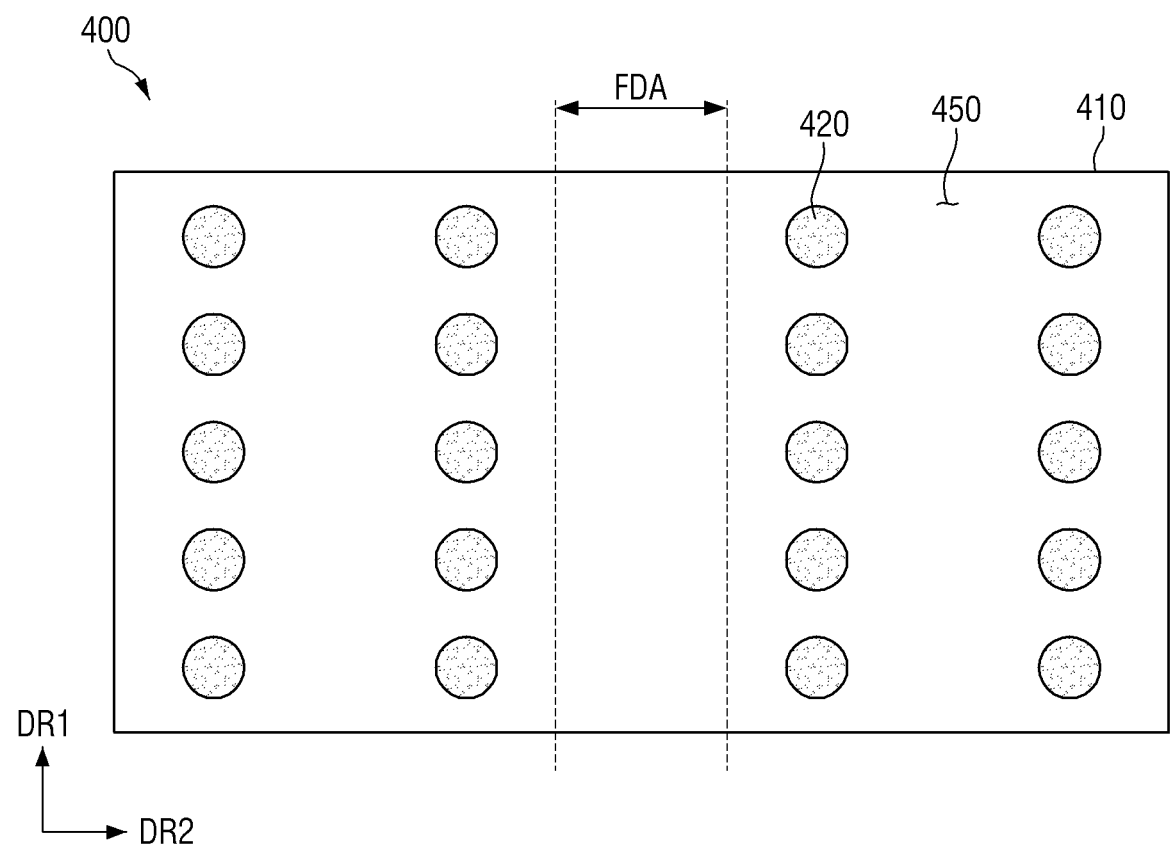
FIG. 8 is a schematic plan view of the metal plate of FIG. 7.
Figure 9:
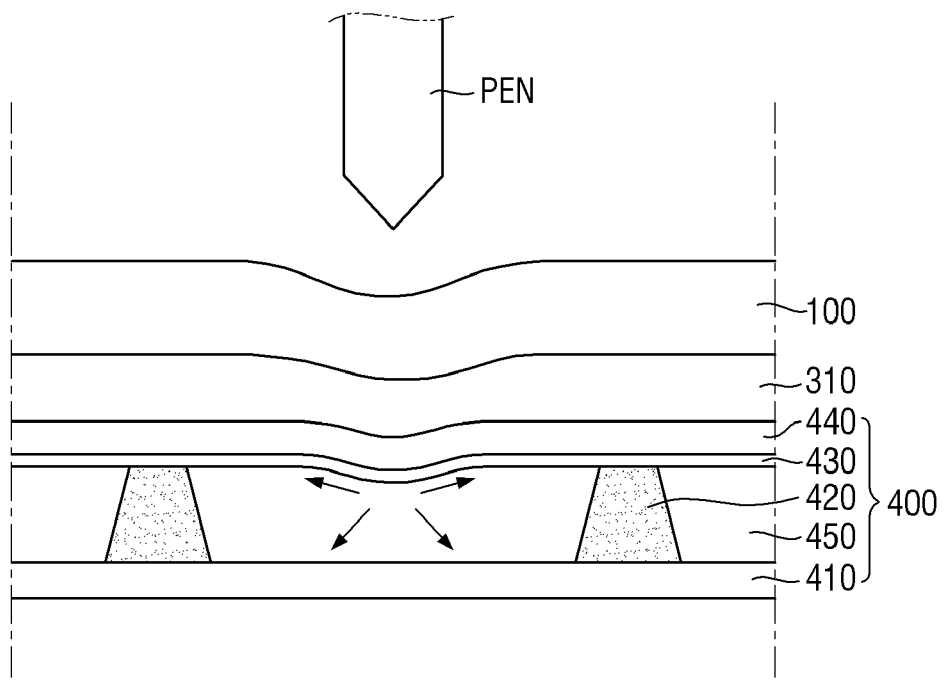
FIG. 9 is a schematic cross-sectional view illustrating a pen drop on a display device including the metal plate of FIG. 7.
Figure 10:
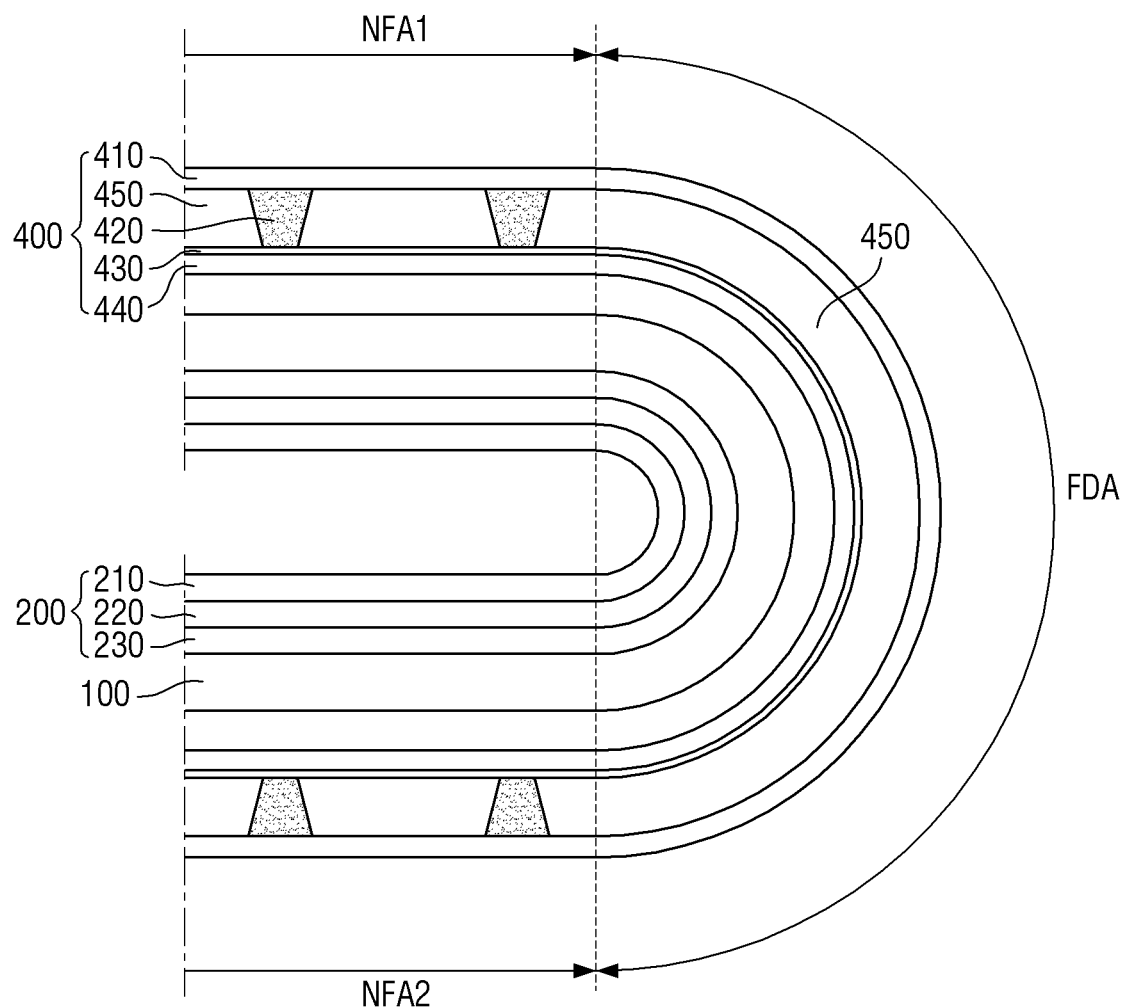
FIG. 10 is a schematic cross-sectional view of the display device of FIG. 9 in a folded state.

FIG. 7 is a schematic cross-sectional view of a metal plate according to an embodiment of the disclosure, FIG. 8 is a schematic plan view of the metal plate of FIG. 7, FIG. 9 is a schematic cross-sectional view illustrating a pen drop on a display device including the metal plate of FIG. 7, and FIG. 10 is a schematic cross-sectional view of the display device of FIG. 9 in a folded state.

Referring to FIG. 7, a metal plate 400 may include first and second plates 410 and 440, which are coupled to each other via a bonding layer 430, and spacers 420 and space 450, which are disposed between the first and second plates 410 and 440. The metal plate 400 may have, defined thereon, the same folding area FDA as that of the display device 10 of FIGS. 1 and 2 or FIGS. 3 and 4.

Specifically, the first plate 410 may support a display device and may protect the display panel 100 of FIG. 5 from external shock.

The first plate 410 may include a rigid or semi-rigid material. Specifically, the first plate 410 may be formed of a metallic material such as SUS or aluminum. For example, the first plate 410 may be a stainless steel film having a thickness of about 10 μm to about 200 μm. In another example, the first plate 410 may be an aluminum film having a thickness of about 10 μm to about 200 μm.

In one embodiment, the first plate 410 may be formed in a rectangular shape in a plan view. The first plate 410 may have a rectangular shape with right-angled corners in a plan view. In other embodiments, the first plate 410 may have the same shape as the display device 10 of FIGS. 1 and 2 or FIGS. 3 and 4, e.g., a rectangular shape with rounded corners, in a plan view. The first plate 410 may have two short sides arranged in a first direction DR1 and two long sides arranged in a second direction DR2.

The spacers 420 may be disposed on the first plate 410. The spacers 420 may maintain the gap between the first and second plates 410 and 440. In one embodiment, the spacers 420 may be disposed to be in contact with a first surface of the first plate 410 that faces the second plate 440.

In one embodiment, the spacers 420 may be formed of a liquid organic material such as, for example, an acrylic resin, a methacrylic resin, polyisoprene, a vinyl resin, an epoxy resin, a urethane resin, a cellulose resin, or a perylene resin. The spacers 420 may include photoresist (PR). The liquid organic material may be provided on the first plate 410 via printing or coating and may be subjected to photolithography, thereby forming the spacers 420.

The spacers 420 may have a rectangular or trapezoid shape in a cross-sectional view taken along the thickness direction thereof. In a case where the spacers 420 are trapezoidal, the length of the lower sides of the spacers 420 that are in contact with the first plate 410 may be greater than the length of the upper sides of the spacers 420. In other embodiments, the length of the lower sides of the spacers 420 that are in contact with the first plate 410 may be smaller than the length of the upper sides of the spacers 420, but the disclosure is not limited thereto.

Referring to FIG. 8, the spacers 420 may be disposed on the first plates 410 as multiple dots. The spacers 420 may have a circular shape in a plan view. In other embodiments, the spacers 420 may have a polygonal shape such as a tetragonal shape in a plan view. The spacers 420 may be a distance apart from one another, or the distance between the spacers 420 may vary from one region to another region. The spacers 420 may be regularly arranged, but the disclosure is not limited thereto. In other embodiments, the spacers 420 may be irregularly arranged.

In one embodiment, the spacers 420 may have a height. The height of the spacers 420 may be about 1 μm to about 200 μm or about 10 μm to about 100 μm. The height of the spacers 420 may be adjusted within a range that can maintain the gap between the first and second plates 410 and 440.

The spacers 420 may occupy a percentage of the area of the top surface of the first plate 410. Specifically, the spacers 420 may occupy about 10% to about 90% of the area of the top surface of the first plate 410. In case that the spacers 420 occupy about 10% or more of the area of the top surface of the first plate 410, the spacers 420 can uniformly maintain the gap between the first and second plates 410 and 440. In case that the spacers 420 occupy about 90% or less of the area of the top surface of the first plate 410, space for the space 450 can be secured between the spacers 420 so that the shock resistance of the metal plate 400 can be improved. Since the spacers 422 may not overlap the folding area FDA but the space 452 may overlap the folding area FDA, the foldability of the metal plate 440 can be improved.

As illustrated in FIG. 7, the second plate 440 may be disposed to face the first plate 410. The second plate 440 may be formed of the same material as the first plate 410. For example, the second plate 440 may include a metallic material such as SUS or aluminum and may be a SUS or aluminum film having a thickness of about 10 μm to about 200 μm. The second plate 440 may have a rectangular shape in a plan view.

The bonding layer 430 may be disposed on a first surface of the second plate 440 that faces the first plate 410. In one embodiment, the bonding layer 430 may be disposed on the entire first surface of the second plate 440.

The bonding layer 430 may be an adhesive or resin layer. The bonding layer 430 may be, for example, a PSA, an optically clear adhesive (OCA), or an optically clear resin (OCR). The bonding layer 430 may be a PSA.

The bonding layer 430 may have a thickness of about 300 μm or less. In one embodiment, the thickness of the bonding layer 430 may be about 200 μm or less or about 100 μm or less. There may be no lower limit for the thickness of the bonding layer 430, but the thickness of the bonding layer 430 may be at least about 10 μm for the bonding layer 430 to exhibit minimum adhesiveness.

The bonding layer 430 may be formed as a single layer or a stack of multiple layers or may be a base member having bonding films attached on both surfaces thereof, like a double-sided tape.

In other embodiments, the bonding layer 430 may include a silicone adhesive or an acrylic adhesive. In other embodiments, the bonding layer 430 may include a crystalline polymer and a rubber-based polymer. However, the material of the bonding layer 430 is not particularly limited. Various other well-known materials or compositions may also be applicable as the material of the bonding layer 430.

As illustrated in FIG. 7, the top surfaces of the spacers 420 may be in contact with the bonding layer 430. The spacers 420, which are disposed on the first plate 410, may be placed in contact with the bonding layer 430 on the second plate 440 so that the first and second plates 410 and 440 may be bonded together.

The bonding layer 430 may be in part in contact with the top surfaces of the spacers 420 and in part spaced apart from the spacers 420. Parts of the bonding layer 430 may be exposed toward the first plate 410. The area of contact between the spacers 420 and the bonding layer 430 may be adjusted such that the first and second plates 410 and 440 can be prevented from being detached from each other in the process of repeatedly folding and unfolding the metal plate 400. The area of contact between the spacers 420 and the bonding layer 430 may be enlarged or reduced by adjusting the size and number of spacers 420.

The space 450 may be disposed between the first and second plates 410 and 440. Specifically, the space 450 may be disposed between the bonding layer 430 and the first plate 410. As illustrated in FIG. 7, the space 450 may be disposed between the spacers 420, between the first plate 410 and the bonding layer 430. For example, regions where the spacers 420 are not disposed may be the space 450. The space 450 may be in contact with the first plate 410, the spacers 420, and the bonding layer 430. The space 450 may be in contact with the top surface of the first plate 410, the sides of each of the spacers 420, and the bottom surface of the bonding layer 430.

In one embodiment, the space 450 may be regions where, e.g., air exists. As illustrated in FIG. 9, the space 450 may absorb external shock by distributing external shock in the air. For example, in a case where a pen may be dropped on top of a display panel 100, the shock can be distributed into the air, and absorbed, by the space 450 of the metal plate 400. As a result, the metal plate 400 can improve the shock resistance of a display device 10.

In one embodiment, the space 450 may occupy a percentage of the area of the top surface of the first plate 410. Specifically, the space 450 may occupy about 10% to about 90% of the area of the top surface of the first plate 410. In case that the space 450 occupies about 10% or more of the area of the top surface of the first plate 410, the space 450 can uniformly maintain the gap between the first and second plates 410 and 440. In case that the space 450 occupies about 90% or less of the area of the top surface of the first plate 410, a number of spacers 420 can be secured so that the gap between the first and second plates 410 and 440 can be maintained.

As illustrated in FIGS. 7 through 9, the space 450 of the metal plate 400 may be disposed to overlap the folding area FDA, and the spacers 420 may be disposed to not overlap the folding area FDA. If the spacers 420 overlap the folding area FDA, stress may be applied to the spacers 420 when the display device 10 is being folded, and as a result, the display device 10 may not be able to be easily folded. However, since in the embodiment of FIGS. 7 through 9, the spacers 420 of the metal plate 400 may be disposed to not overlap the folding area FDA and the space 450 of the metal plate 400 are disposed to overlap the folding area FDA, the folding and unfolding of the metal plate 400 can be facilitated.

Also, when the display device 10 is being folded, stress may be applied to the metal plate 400. Since the space 450, which may be filled with, e.g., air, may be disposed in the metal plate 400, the stress can be absorbed by the space 450 and can thus be reduced, and as a result, the folding of the display device 10 can be facilitated. Also, since the space 450 may be disposed in the metal plate 400, strain that deforms the metal plate 400 can be increased by the stress applied to the metal plate 400, and as a result, the folding of the metal plate 400 can be facilitated.

Figure 11:
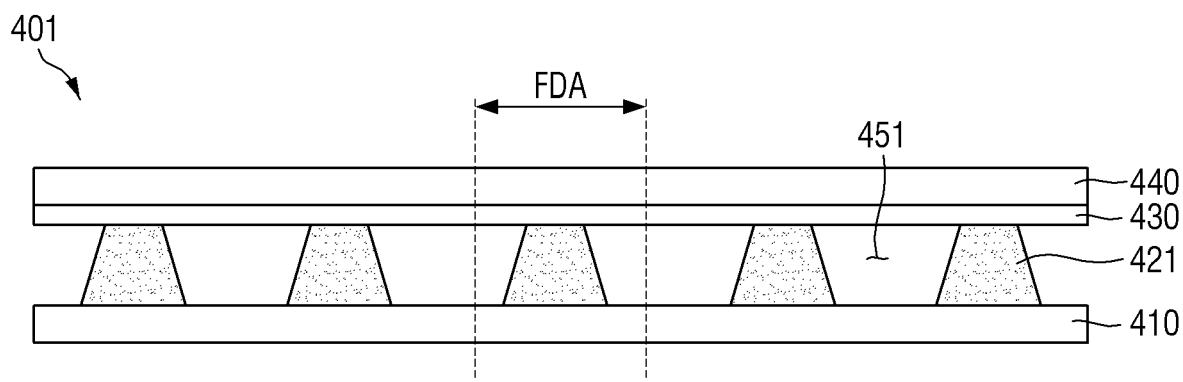
FIG. 11 is a schematic cross-sectional view of a metal plate according to another embodiment of the disclosure.
Figure 12:
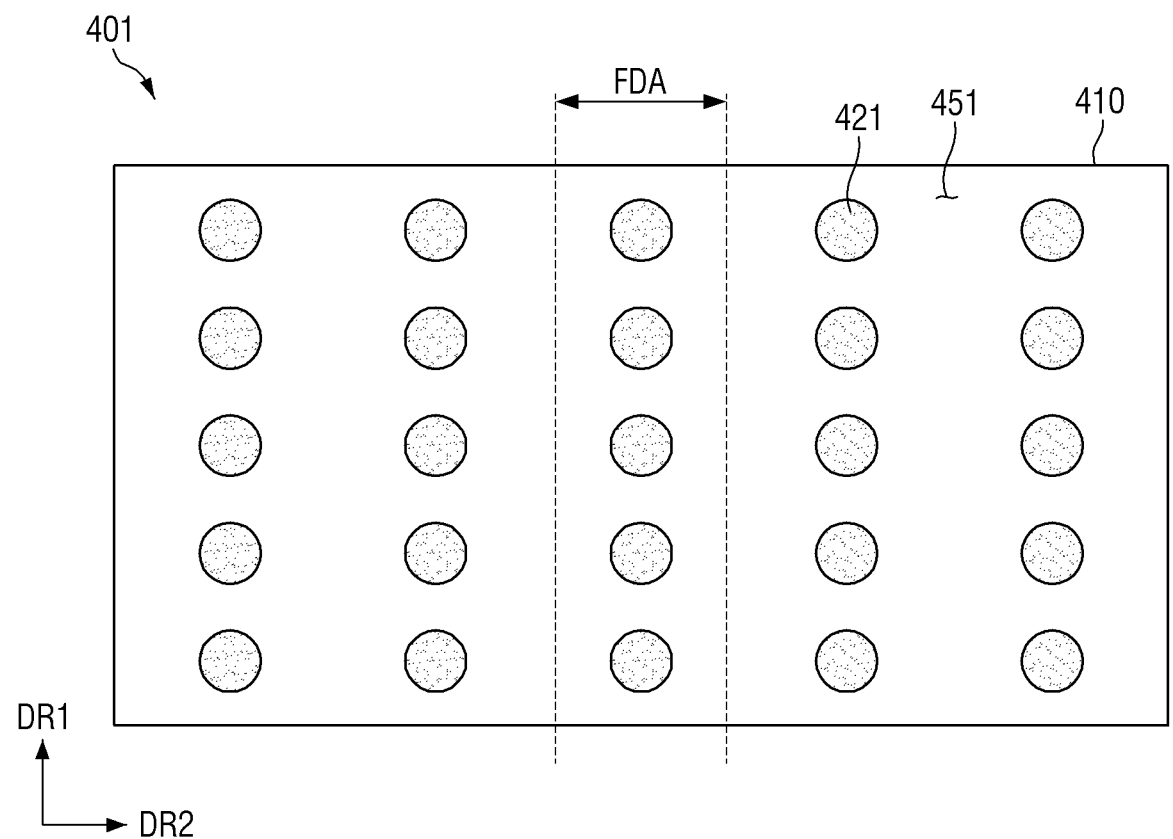
FIGS. 12 through 14 are schematic plan views of the metal plate of FIG. 11.
Figure 13:
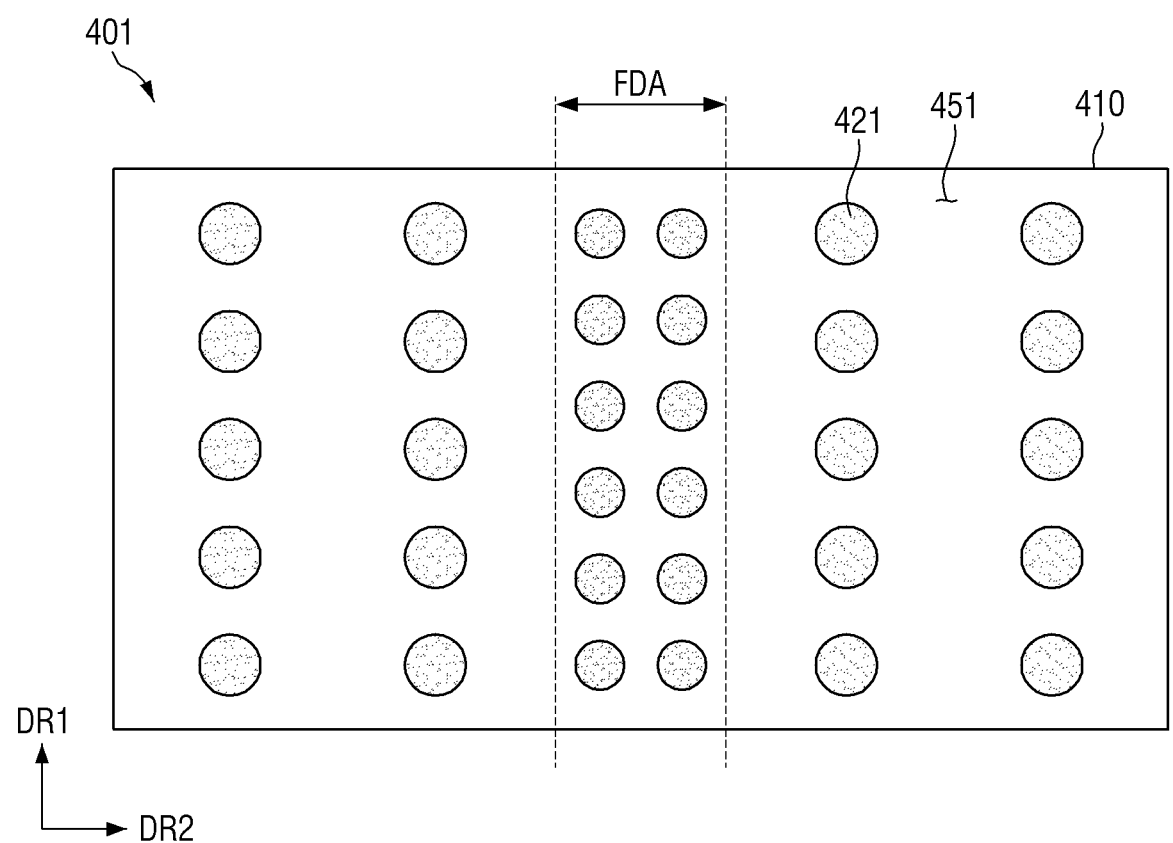
Figure 14:
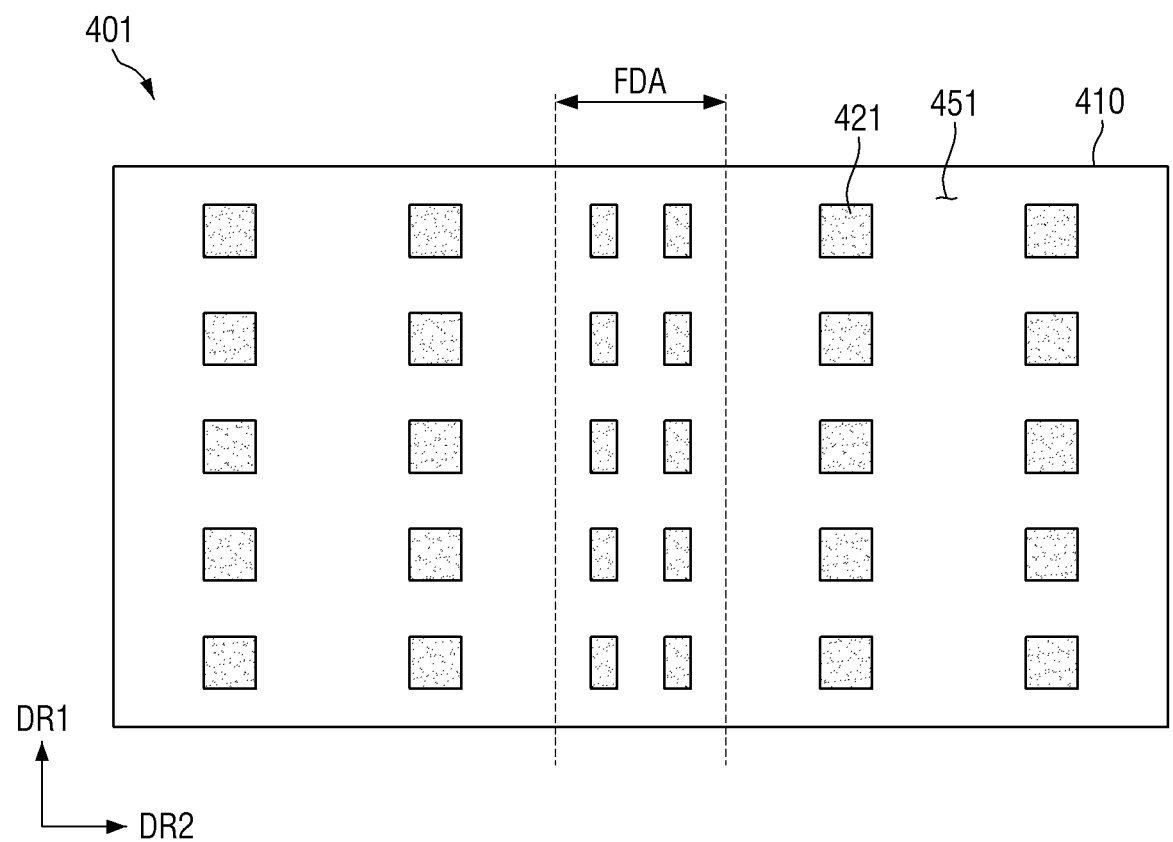

FIG. 11 is a schematic cross-sectional view of a metal plate according to another embodiment of the disclosure, and FIGS. 12 through 14 are schematic plan views of the metal plate of FIG. 11.

The embodiment of FIGS. 11 through 14 differ from the embodiment of FIGS. 7 through 10 in that spacers may be disposed in a folding area. The embodiments of FIGS. 11 through 14 will hereinafter be described, focusing mainly on the differences with the embodiment of FIG. 7 through 10.

Referring to FIGS. 11 and 12, a metal plate 401 may include spacers 421 and space 451.

The spacers 421 and the space 451 may be disposed to overlap a folding area FDA. Spacers 421 may be formed and arranged as dots. The spacers 421 may be a distance apart from one another in the folding area FDA, or the distance between the spacers 421 may be uniform or may vary.

When a display device 10 is being folded, stress may be applied to the folding area FDA. When the display device 10 is being folded, first and second plates 410 and 440 may be placed in contact with each other in the folding area FDA even though there exist a gap between the first and second plates 410 and 440 due to the presence of the spacers 421. If the first and second plates 410 and 440 may be placed in contact with each other, the space 451 may disappear so that the metal plate 401 may become vulnerable to external shock. However, since the spacers 421 may be disposed even in the folding area FDA, the first and second plates 410 and 440 can be prevented from being placed in contact with each other when the display device 10 is being folded, so that the shock resistance of the metal plate 401 can be maintained.

Referring to FIG. 13, the planar area of spacers 421 that overlap the folding area FDA may be smaller than the planar area of spacers 421 that may not overlap the folding area FDA. Here, the planar area of the spacers 421 may refer to the area, in a plan view, of the spacers 421. The smaller the planar area of the spacers 421, the greater the number of spacers 421 that can be arranged in the folding area FDA. The greater the number of spacers 421 may be, the more uniformly the first and second plates 410 and 440 can be bonded together throughout the folding area FDA. However, the disclosure is not limited to this. In other embodiments, the planar area of the spacers 421 that overlap the folding area FDA may be greater than the planar area of the spacers 421 that may not overlap the folding area FDA.

Referring to FIG. 14, the spacers 421 may have a rectangular shape in a plan view. In one embodiment, the planar shape of at least some of the spacers 421 that overlap the folding area FDA may differ from the planar shape of at least some of the spacers 421 that may not overlap the folding area FDA. For example, in a plan view, the spacers 421 that overlap the folding area FDA may have a rectangular shape, and the spacers 421 that may not overlap the folding area FDA may have a square shape. In this example, the spacers 421 that overlap the folding area FDA may be arranged to have their length direction in line with the short sides of the first plate 410. In some embodiments, the spacers 421 that overlap the folding area FDA may have a rectangular shape that extends longer in a first direction DR1 than in a second direction DR2, in which case, the folding of the display device 10 can be facilitated because the spacers 421 may be narrow in the direction in which stress may be applied when the display device 10 is being folded.

Figure 15:
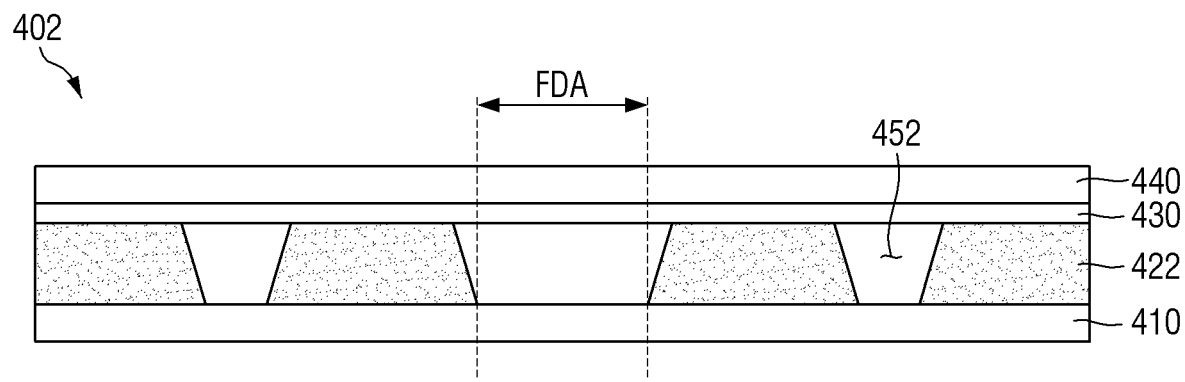
FIG. 15 is a schematic cross-sectional view of a metal plate according to another embodiment of the disclosure.
Figure 16:
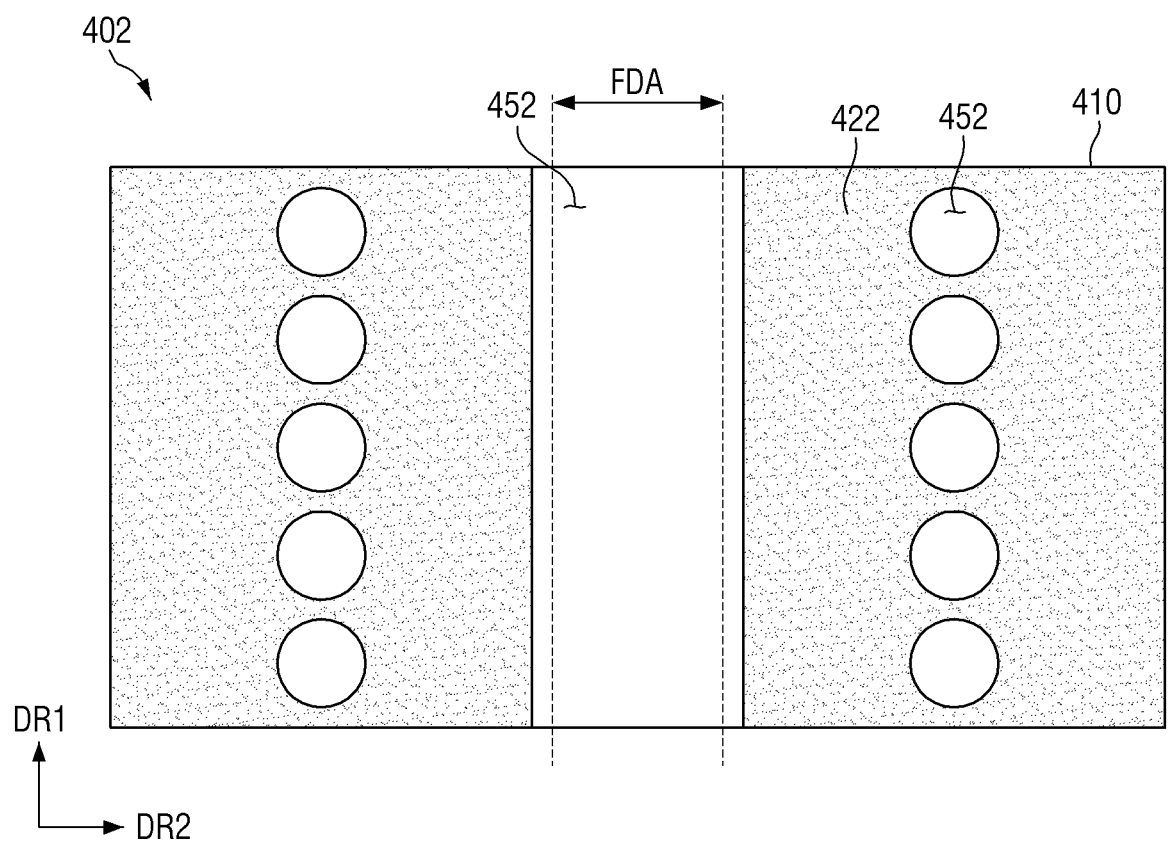
FIG. 16 is a schematic plan view of the metal plate of FIG. 15.
Figure 17:
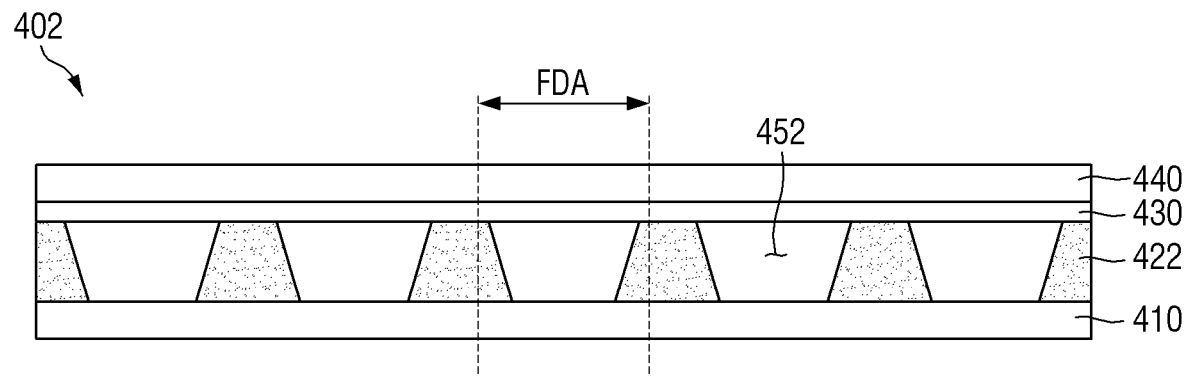
FIG. 17 is a schematic cross-sectional view of the metal plate of FIG. 15.

FIG. 15 is a schematic cross-sectional view of a metal plate according to another embodiment of the disclosure, FIG. 16 is a schematic plan view of the metal plate of FIG. 15, and FIG. 17 is a schematic cross-sectional view of the metal plate of FIG. 15.

The embodiment of FIGS. 15 through 17 differs from the embodiments of FIGS. 7 through 14 in that space may be formed and arranged as dots. The embodiment of FIGS. 15 through 17 will hereinafter be described, focusing mainly on the differences with the embodiments of FIGS. 7 through 14.

Referring to FIGS. 15 and 16, a metal plate 402 may include a spacer 422, which may be formed as a layer, and space 452, which may be formed in the spacer 422 as openings. For example, the space 452 may be holes formed in the spacer 422.

The spacer 422 may be disposed on a first plate 410 as a layer. The spacer 422 may be formed by coating the first plate 410 with, for example, photoresist. The space 452 may be formed by exposing and removing parts of the photoresist. In a case where the spacer 422 may be formed as a layer, the contact area of the spacer 422 and a bonding layer 430 increases, and as a result, the adhesiveness between the first plate 410 and a second plate 440 can be improved.

In the embodiments of FIGS. 7 through 14, the spacers 421 may be formed as island patterns. On the contrary, in the embodiment of FIGS. 15 through 17, the spacer 422 may be formed as a layer, and the space 452 may be formed as island-type openings.

Referring to FIG. 16, the space 452 may be formed in a folding area FDA as openings exposed to the sides of the first plate 410 and in areas other than the folding area FDA as island-type openings surrounded by the spacer 422. Since the spacer 422 may not overlap the folding area FDA but the space 452 overlaps the folding area FDA, the folding of the metal plate 402 can be facilitated.

Referring to FIG. 17, in some embodiments, the spacer 422 may partially overlap the folding area FDA. A space 452 may be disposed in the folding area FDA between parts of the spacer 422 and may overlap the folding area FDA. Accordingly, the adhesiveness between the first and second plates 410 and 440 and the shock resistance of the metal plate 402 can both be improved.

Figure 18:
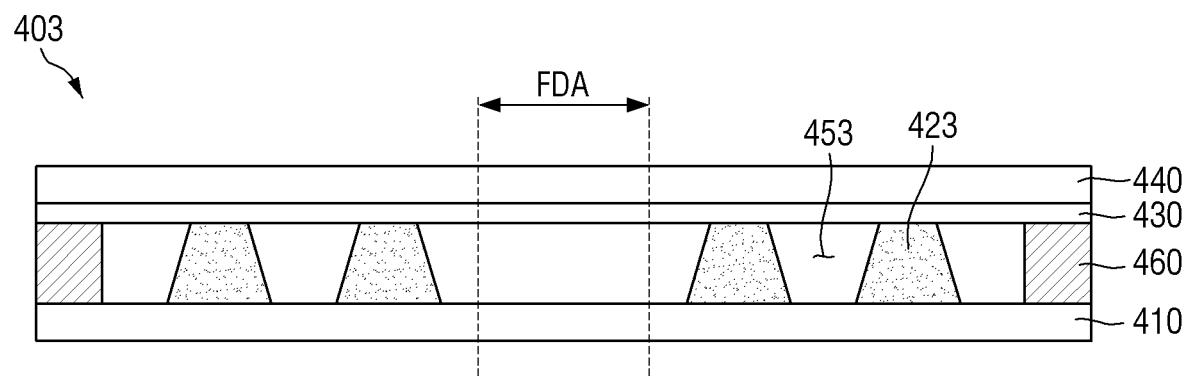
FIG. 18 is a schematic plan view of a metal plate according to another embodiment of the disclosure.
Figure 19:
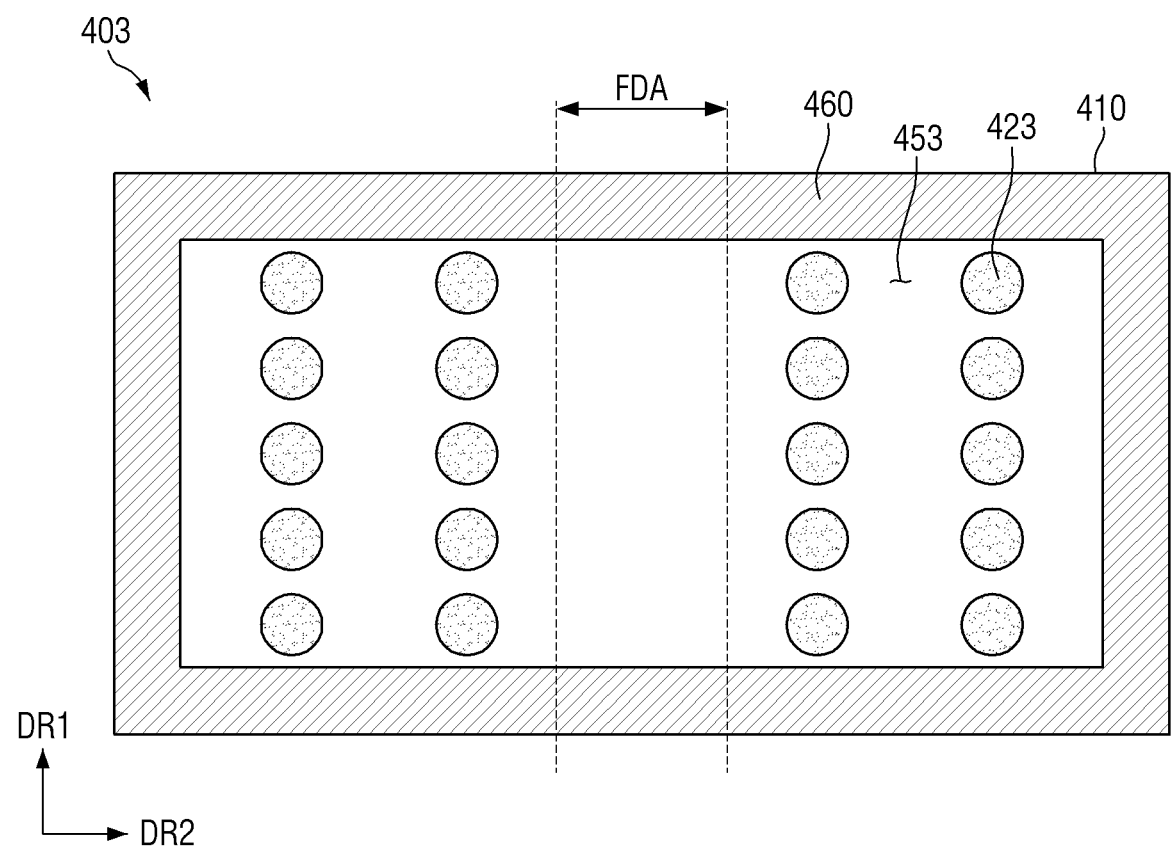
FIG. 19 is a schematic plan view of the metal plate of FIG. 18.

FIG. 18 is a schematic plan view of a metal plate 403 according to another embodiment of the disclosure, and FIG. 19 is a schematic plan view of the metal plate of FIG. 18.

The embodiment of FIGS. 18 and 19 differs from the embodiments of FIGS. 7 through 17 in that an adhesive member may be further disposed between first and second metal plates. The embodiment of FIGS. 18 and 19 will hereinafter be described, focusing mainly on the differences with the embodiments of FIGS. 7 through 17.

Referring to FIGS. 18 and 19, an adhesive member 460 may be disposed between first and second metal plates 410 and 440. The adhesive member 460 may be disposed along the edges of each of the first and second metal plates 410 and 440. In one embodiment, the adhesive member 460 may be a sealant, but various other well-known materials or compositions may also be used as the adhesive member 460.

The adhesive member 460 may be disposed in the form of a closed loop along the edges of each of the first and second metal plates 410 and 440. The adhesive member 460 may be disposed to overlap the folding area FDA. Since the adhesive member 460 has a large modulus, the adhesive member 460 may be easily foldable even if disposed in the folding area FDA.

Spacers 423 and space 453 may be disposed in a region defined by the adhesive member 460. The space 453 may include, e.g., air. In a case where the first and second metal plates 410 and 440 may be bonded together in an atmospheric pressure environment, the space 453 may include, e.g., air. However, the disclosure is not limited to this. In other embodiments, in a case where the first and second metal plates 410 and 440 may be bonded together in a vacuum environment, the space 453 may include a vacuum.

As described above, the first and second metal plates 410 and 440 may be bonded together using the adhesive member 460. Accordingly, the adhesiveness between the first and second metal plates 410 and 440 can be improved when the display device 10 is being folded.

Figure 20:
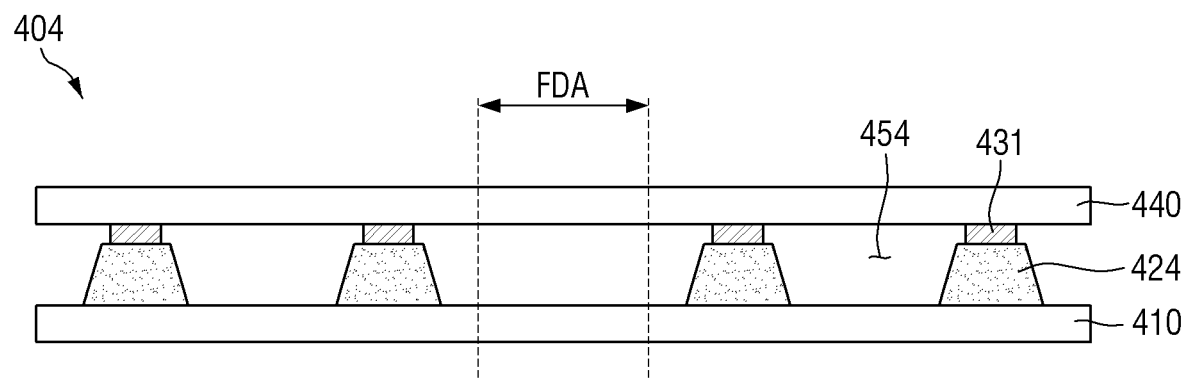
FIG. 20 is a schematic cross-sectional view of a metal plate according to another embodiment of the disclosure.
Figure 21:
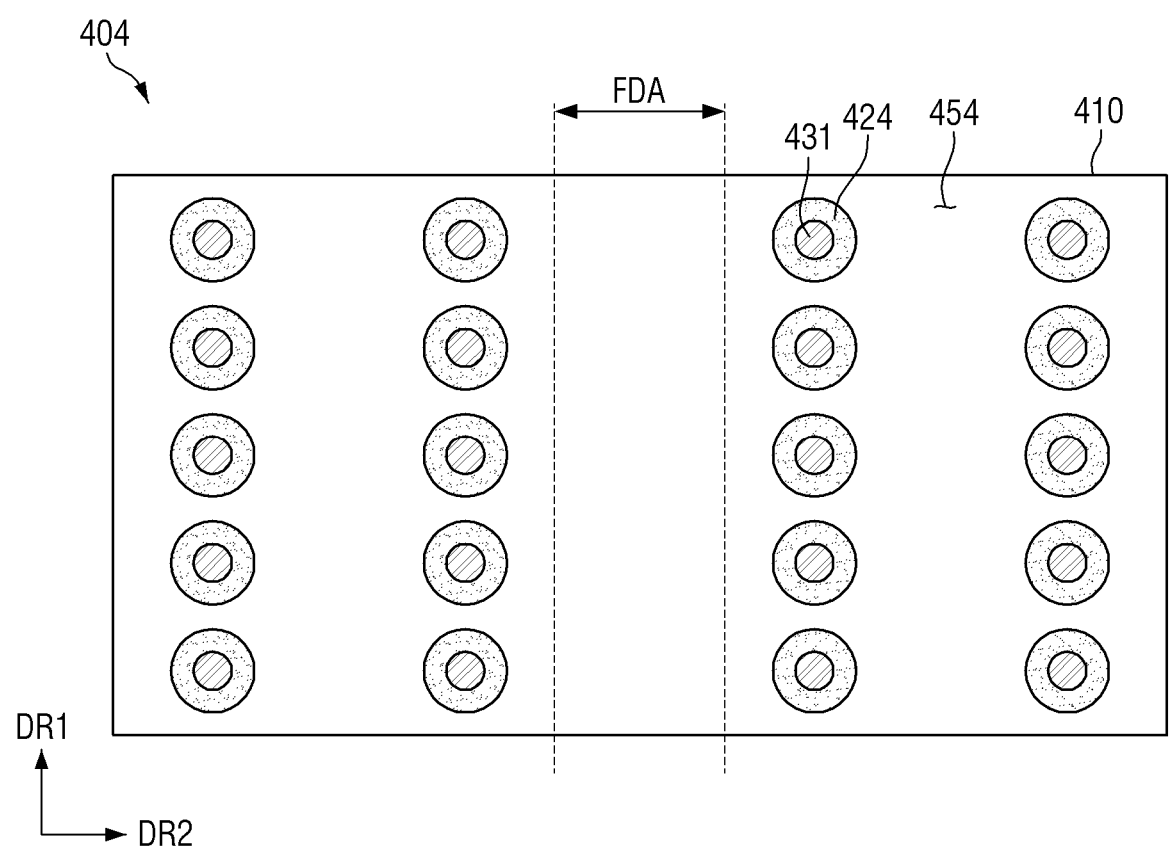
FIG. 21 is a schematic plan view of the metal plate of FIG. 20.

FIG. 20 is a schematic cross-sectional view of a metal plate 404 according to another embodiment of the disclosure, and FIG. 21 is a schematic plan view of the metal plate of FIG. 20.

The embodiment of FIGS. 20 and 21 differs from the embodiments of FIGS. 7 through 19 in that bonding layers may be disposed only on the top surfaces of spacers. The embodiment of FIGS. 20 and 21 will hereinafter be described, focusing mainly on the differences with the embodiments of FIGS. 7 through 19.

Referring to FIGS. 20 and 21, bonding layers 431 may be disposed at least on parts of the top surfaces of spacers 424. Specifically, the bonding layers 431 may be disposed between the spacers 424 and a second plate 440. The bonding layers 431 may be disposed on the top surfaces of the spacers 424 to bond the spacers 424 and the second plate 440 together. The bonding layer 431 may be formed on a first surface of the second plate 440 that faces the spacers 424, via, for example, a dispenser.

Parts of the top surfaces of the spacers 424 may overlap the bonding layers 431, and parts of the top surfaces of the spacers 424 may not overlap the bonding layers 431. Space 454 may be disposed between the second plate 440 and the parts of the top surfaces of the spacers 424 that may not overlap the bonding layers 431. For example, the parts of the top surfaces of the spacers 424 that may not overlap the bonding layers 431 may overlap the space 454. In other embodiments, the entire top surfaces of the spacers 424 may overlap the bonding layers 431. The bonding layers 431 may not overlap portion of the top surface of a first plate 410 that does not overlap the spacers 424. The space 454 may be in contact with the first plate 410, the spacers 424, the bonding layers 431, and the second plate 440.

The bonding layers 431 may overlap the spacers 424, but not with a folding area FDA, but the disclosure is not limited thereto. If the spacers 424 overlap the folding area FDA, the bonding layers 431 may be disposed on the top surfaces of the spacers 424 to overlap the folding area FDA.

As illustrated in FIG. 21, the planar area of the bonding layers 431 may be smaller than the planar area of the spacers 424, but the disclosure is not limited thereto. In other embodiments, the planar area of the bonding layers 431 may be the same as the planar area of the spacers 424, in which case, the sides of each of the bonding layers 431 may be aligned with the sides of a corresponding spacer 424.

In the embodiment of FIGS. 20 and 21, the bonding layers 431 may be disposed only on the top surfaces of the spacers 424. Thus, stress applied to the bonding layer 431 when a display device 10 is being folded can be properly distributed so that the folding of the display device 10 can be facilitated.

Figure 22:
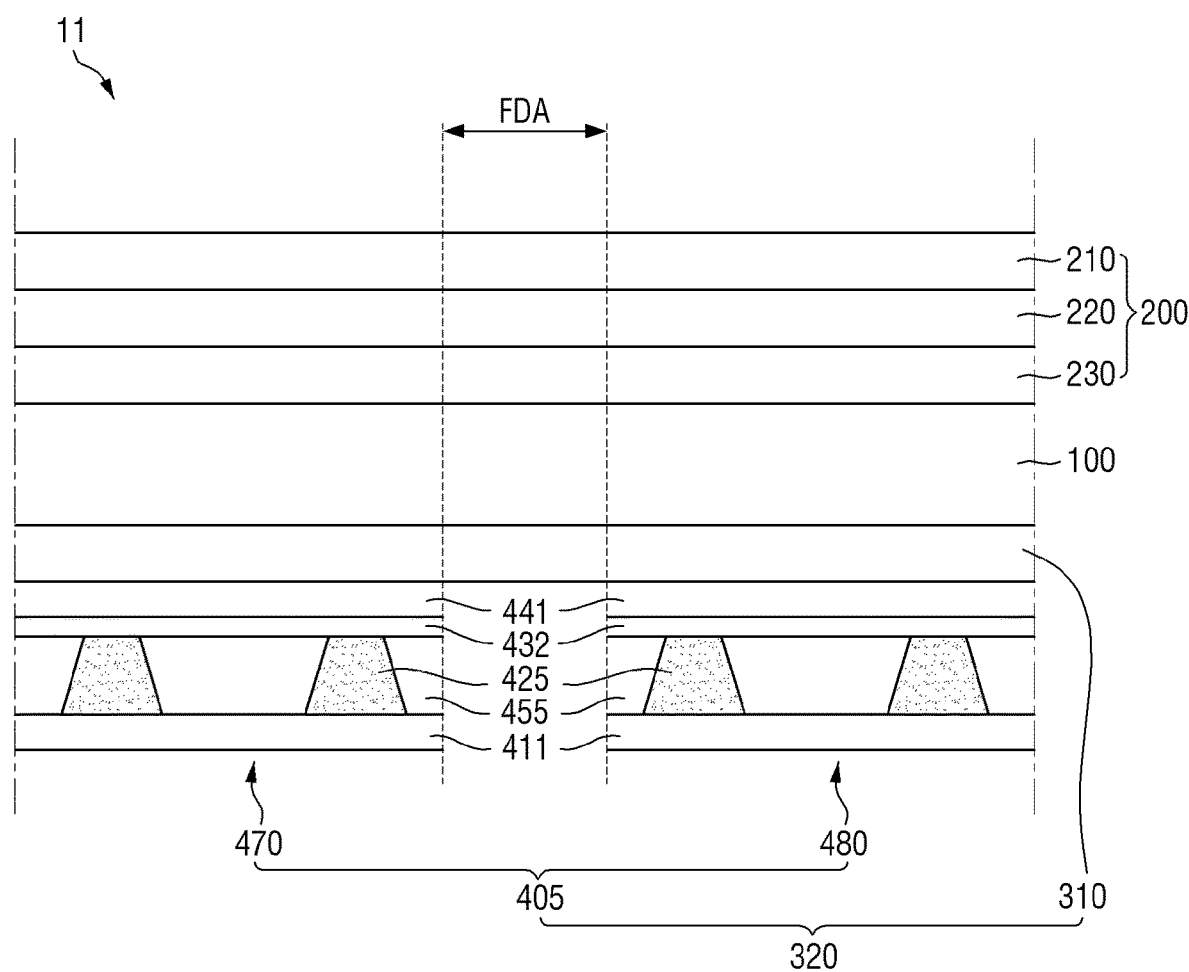
FIG. 22 is a schematic cross-sectional view of a display device according to another embodiment of the disclosure.

FIG. 22 is a schematic cross-sectional view of a display device according to another embodiment of the disclosure.

The embodiment of FIG. 22 differs from the embodiments of FIGS. 7 through 21 in that a metal plate may be divided into two metal plates. The embodiment of FIG. 22 will hereinafter be described, focusing mainly on the differences with the embodiments of FIGS. 7 through 21.

Referring to FIG. 22, a metal plate 405 may include first and second metal plates 470 and 480, which may be horizontally isolated or spaced apart from each other. The first and second metal plates 470 and 480 may be disposed to be spaced apart from each other in a folding area FDA and may not overlap the folding area FDA. The first and second metal plates 470 and 480 may have the same thickness and width, but the disclosure is not limited thereto.

Each of the first and second metal plates 470 and 480 may include a first plate 411, a second plate 441, spacers 425, a bonding layer 432, and space 455. The spacers 425 and the space 455 may be disposed to not overlap the folding area FDA.

Since the metal plate 405 includes the first and second metal plates 470 and 480, which may be separate from each other, the folding of a display device 11 can be facilitated. Also, since the space 455 may be provided in the metal plate 405, the shock resistance of the metal plate 405 can be improved.

Figure 23:
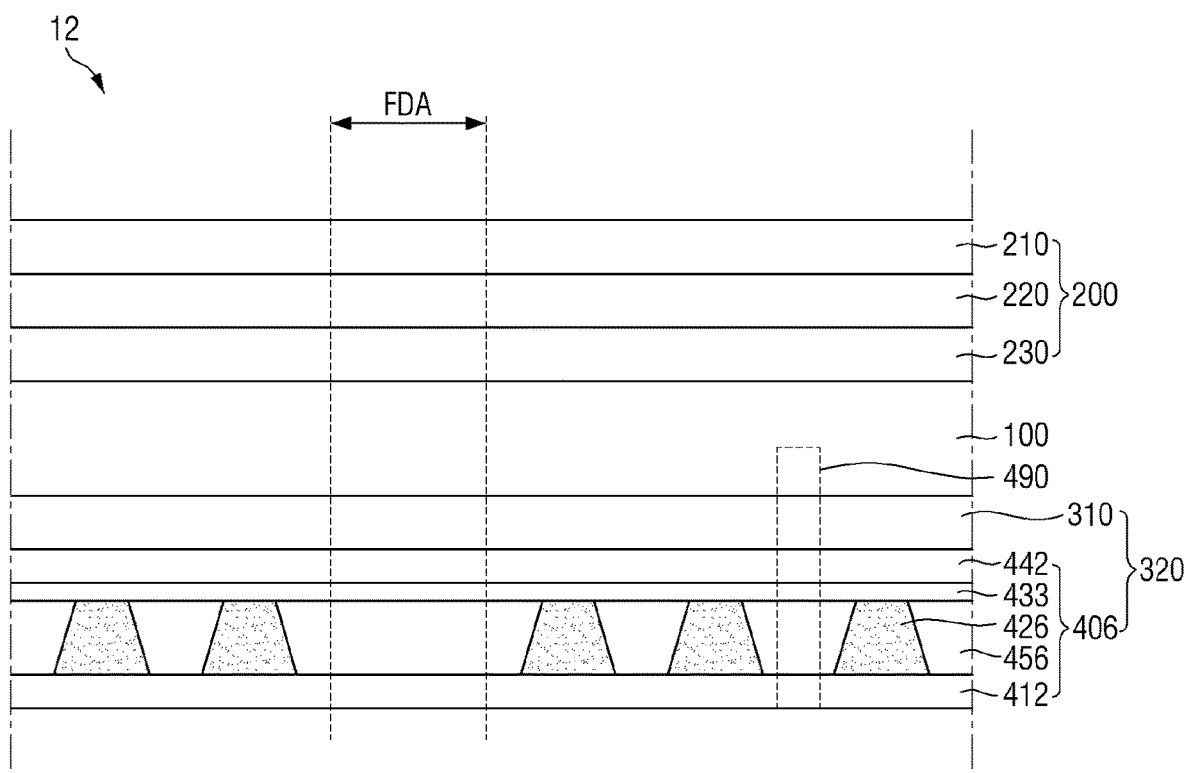
FIG. 23 is a schematic cross-sectional view of a display device according to another embodiment of the disclosure.

FIG. 23 is a schematic cross-sectional view of a display device according to another embodiment of the disclosure.

The embodiment of FIG. 23 differs from the embodiments of FIGS. 7 through 22 in that a camera hole may be disposed in a display device. The embodiment of FIG. 23 will hereinafter be described, focusing mainly on the differences with the embodiments of FIGS. 7 through 22.

Referring to FIG. 23, a display device 12 may include a camera hole 490, in which a camera can be disposed. The camera hole 490 may be a hole that penetrates a cushion layer 310 and a metal plate 406 (which may include first and second plates 412, 442), from portion of a display panel 100. The camera hole 490 may be a hole in which a camera can be inserted from below the metal plate 406.

Space 456 of the metal plate 406 may be disposed to overlap the camera hole 490, and the camera hole 490 may penetrate one of the space 456. The spacers 426 may be disposed to be spaced apart from the camera hole 490, but the disclosure is not limited thereto. In other embodiments, the camera hole 490 may overlap one of the spacers 426. A bonding layer 433 may overlap the camera hole 490 and may be penetrated by the camera hole 490. In other embodiments, the bonding layer 433 may be disposed to be spaced apart from the camera hole 490.

A camera hole area including the camera hole 490 may be susceptible to shock. However, since one of the space 456 may be disposed in an area that overlaps the camera hole 490, the shock resistance of the camera hole area can be improved.

In concluding the detailed description, those skilled in the art will appreciate that many variations and modifications can be made to the embodiments without substantially departing from the principles of the invention. Therefore, the disclosed embodiments of the invention are used in a generic and descriptive sense only and not for purposes of limitation.

What is claimed is:

1. A display device comprising:
a display panel including a folding area and
a metal plate disposed below the display panel, the metal plate including:
a first plate and a second plate which are spaced apart from and face each other;
at least one spacer disposed between the first plate and the second plate; and
a space between the first plate and the second plate, the space excluding the at least one spacer.

2. The display device of claim 1, wherein
the at least one spacer do not overlap the folding area, and the space overlaps the folding area.

3. The display device of claim 1, wherein a portion of the at least one spacer and a portion of the space overlap the folding area.

4. The display device of claim 3, wherein an area where the at least one spacer overlaps the folding area is smaller than an area where the at least one spacer does not overlap the folding area.

5. The display device of claim 4, wherein a shape in a plan view where the at least one spacer overlaps the folding area differs from a shape in a plan view where the at least one spacer does not overlap the folding area.

6. The display device of claim 1, wherein the at least one spacer occupies about 10% to about 90% of a surface area of the first plate.

7. The display device of claim 1, wherein the space occupies about 10% to about 90% of the surface area of the first plate.

8. The display device of claim 1, further comprising:
a bonding layer disposed between a surface of the at least one spacer and the first or second plate adjacent to the surface of the at least one spacer.

9. The display device of claim 8, wherein the bonding layer couples the at least one spacer and the first or second plate.

10. The display device of claim 9, wherein the bonding layer is entirely disposed on a surface of the first or second plate.

11. The display device of claim 9, wherein the bonding layer overlaps the at least one spacer and does not overlap the space.

12. The display device of claim 1, further comprising:
an adhesive member disposed between the first plate and the second plate,
wherein the adhesive member is disposed along edges of the first plate and the second plate.

13. The display device of claim 12, wherein the adhesive member surrounds the at least one spacer and the space in a plan view.

14. The display device of claim 1, wherein
the metal plate includes a first metal plate and a second metal plate which are separate from each other, and
each of the first metal plate and the second metal plate includes the first plate, the second plate, the at least one spacer, and the space.

15. The display device of claim 14, wherein the first metal plate and the second metal plate do not overlap the folding area.

16. The display device of claim 1, wherein
the display panel and the metal plate include a camera hole, and
the camera hole overlaps and penetrate the space.

17. A display device comprising:
a display panel including a folding area; and
a metal plate disposed below the display panel, the metal plate including:
a first plate and a second plate which are spaced apart from and face each other;
at least one spacer disposed between the first plate and the second plate; and
a space in which a part of the at least one spacer is open between the first plate and the second plate.

18. The display device of claim 17, wherein the space is surrounded by the at least one spacer in a plan view.

19. The display device of claim 17, wherein the space is in contact with the first plate and the second plate and passes through the spacers.

20. The display device of claim 17, wherein the display device is an in-foldable display device such that a display surface faces inwards, or an out-foldable display device such that a display surface faces outwards.

* * * * *